July 13, 1965    H. N. MARTIN    3,193,977
EXPANDABLE TOOL WITH FLUID PRESSURE APPLICATOR
Filed May 31, 1963    2 Sheets-Sheet 1
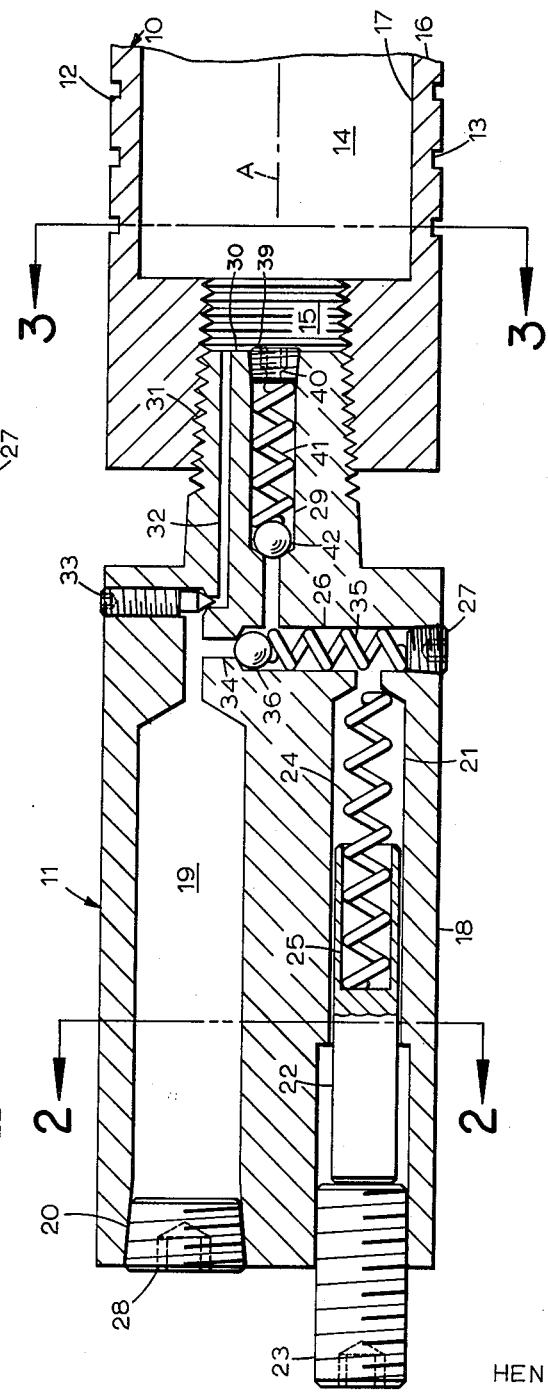
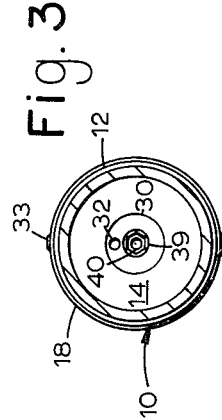
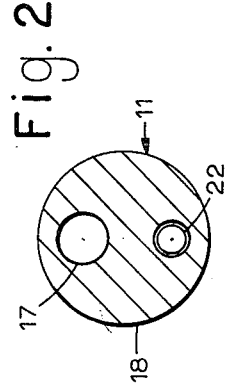
INVENTOR.
HENRY N. MARTIN
BY
Howard Keiser
John F. Verhoeven
ATTORNEYS July 13, 1965   H. N. MARTIN   3,193,977
EXPANDABLE TOOL WITH FLUID PRESSURE APPLICATOR
Filed May 31, 1963   2 Sheets-Sheet 2

United States Patent Office 3,193,977
Patented July 13, 1965

3,193,977
EXPANDABLE TOOL WITH FLUID
PRESSURE APPLICATOR
Henry N. Martin, Cincinnati, Ohio, assignor to The
Cincinnati Milling Machine Co., Cincinnati, Ohio,
a corporation of Ohio
Filed May 31, 1963, Ser. No. 284,422
2 Claims. (Cl. 51—397)

The present invention relates to a metal working tool.

It is desirable, in some tools, to be able to adjust the effective size of the tool. For example, the tool bar of some lapping tools used to lap bores is provided with a longitudinal slit to divide at least a portion of the tool bar into two side-by-side longitudinal sections which can be spread apart by wedges or screws to expand the tool bar. Thus, as the outer diameter of the tool diminishes from wear, the tool bar can be expanded to compensate for this wear.

In the present invention, a tool is provided in which the effective size of the tool can be changed quickly, conveniently, and precisely by the application of pressure. In the preferred form of the invention, as applied to a lapping tool to lap bores, a central chamber is provided in the lapping bar of the tool, the chamber extending almost the full length of the tool bar. The tool bar chamber, which has a diameter only slightly smaller than the outer diameter of the tool bar, has an opening at one end of the tool bar for communication with a pressure applicator connected to that end of the tool bar. Any selected pressure can be applied to the chamber by the applicator and maintained in the chamber, and this pressure, acting evenly along the entire length of the tool bar, will expand the tool bar to a desired size. The tool bar need not be expanded to full desired size and then worked into the bore (since this tends to flare, or bell-mouth, the mouth of the bore) but, instead, can be inserted into the bore with low pressure in the chamber and then expanded to the desired operating size. The pressure applicator, which has a fluid reservoir, a piston, and check valves for increasing and maintaining the pressure inside the tool bar, is preferably detachable so that it can be used with different lapping bars.

It is therefore one object of the present invention to provide an improved tool, the effective size of which can be quickly, easily, and accurately adjusted. It is another object of the present invention to provide a tool, the effective size of which can be adjusted by the application of fluid pressure. It is yet another object of the present invention to provide an improved lapping tool of adjustable size which can be easily positioned in full registration with the work before the effective size of the tool is changed for operating engagement with the work. It is still another object of the present invention to provide an improved tool for lapping bores with a tool bar which can be readily inserted fully into the bore and then expanded into operating engagement with the work. It is a further object of the present invention to provide a tool, such as a lapping tool, having a tool bar expandable by fluid pressure, in which a pressure applicator, connected to the tool bar for the application of pressure thereto, can be detached therefrom for use with other tool bars.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is an enlarged view, in cross-section, of the pressure applicator of the tool of the present invention;

FIGS. 2 and 3 are views taken on the lines 2—2 and 3—3 of FIG. 1, respectively;

Figure 4:
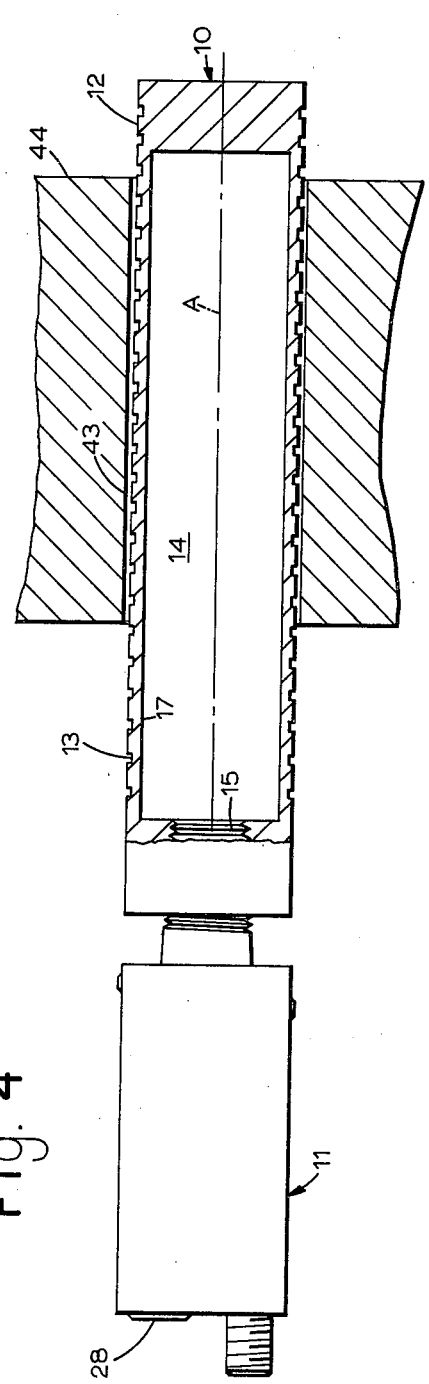
FIG. 4 is a view, partly in cross-section of the tool in its unexpanded condition, inside a bore.

There is shown in the drawings a lapping tool comprising a lapping bar 10 and a pressure applicator 11. The lapping bar 10, which is cylindrical, has a central longitudinal axis A and has an external operating surface 12. The operating surface 12 has longitudinal and circumferential spaced grooves 13 which, as in conventional lapping tools, will tend to hold the lapping compound applied to the tool. The lapping bar is hollow to define a thin-walled cavity, or chamber, 14 extending substantially the full length of the lapping bar. Chamber 14, which is cylindrical, has a threaded opening 15 at one end and is closed at the opposite end so that, when opening 15 is closed, the chamber 14 is fluid tight. Thus the lapping bar has an annular, longitudinally extending, thin wall 16, the inner surface 17 of which bounds the chamber 14 and the outer surface 12 of which defines the operating surface of the lapping bar. The wall, particularly at the base of the grooves 13, is thin so that, on an increase of pressure in the chamber, the wall moves radially outwardly to expand the lapping bar and to increase the diameter of the tool. Conversely, on a decrease, or release, of pressure from chamber 14, the lapping bar contracts.

The pressure applicator 11 has a housing 18 with a chamber 19 therein constituting a reservoir for hydraulic fluid which is introduced thereto through an end opening 20 having a removable plug 28. The applicator housing has a cylindrical bore 21 in which a piston 22 is slidably received. One end of the piston 22 is urged against a plug 23 threadedly received in the housing by a spring 24 which is received in the bore 21 and which is seated in a blind hole 25 in the piston. A cross-bore 26, blocked at one end by plug 27, is in communication with bore 21 and in communication with a longitudinal channel 29 terminating at the end face 30 of a threaded stud 31 on the applicator housing. A channel 32 extends from the fluid reservoir 19 to end face 30 and can be selectively opened or blocked by an adjustable needle valve 33. The end of cross-bore 26 opposite plug 27 is connected by channel 34 to channel 32 on the reservoir side of needle valve 33. A spring 35 and ball 36 in cross-bore 26 define a check valve which permits flow of fluid from reservoir 19 to cross-bore 26 but not from cross-bore 26 to the reservoir. Channel 29, which has a plug 39 with opening 40 therethrough at end face 30, has a spring 41 and ball 42 defining a check valve to permit fluid under pressure to flow from cross-bore 26 out through opening 40 but not from opening 40 to cross-bore 26. When ball 42 is seated and needle valve 33 is screwed down as shown in FIG. 1, opening 15 is closed and chamber 14 is sealed.

For operation of the tool, the chamber 14 of the lapping bar, and the chamber 19 of the pressure applicator, are initially full of hydraulic fluid, plug 23 is fully screwed in, and the stud 31 of the applicator is threadedly engaged in the opening 15 of the lapping bar. Needle valve 33 is adjusted to close channel 32. At this time, the fluid in chamber 14 is under little or no pressure and the lapping bar is in its relaxed condition with the outer diameter thereof slightly smaller than the diameter of the bore 43 of workpiece 44 which is to be lapped, as shown in FIG. 4. With the lapping bar relaxed (that is, in its contracted condition) the bar (with the abrasive lapping compound applied on its external operating surface) can be easily inserted into the bore 43. Thereafter, pressure is applied to the chamber 14 by actuation of piston 22 which defines a pump having a fluid outlet passage (bores 26, 29) in communication with opening 15 of the chamber. Preferably, the diameter of piston 22 is considerably smaller (as, for example, one-fourth) the diameter of chamber 14 to facilitate actuation of piston 22 and, consequently, the piston 22 will generally have to be reciprocated several times to build up the pressure in chamber 14. Piston 22 is retracted by spring 24 when plug 23 is screwed out to the position shown in FIG. 1. This draws fluid from reservoir 19, through the check valve defined by spring 35 and ball 36, and into bore 21 ahead of the piston 22. Piston 22 is then advanced (to the right as viewed in FIG. 1) by screwing plug 23 into the housing by a plug wrench, thus forcing the fluid ahead of the piston into chamber 14 through the check valve defined by spring 41 and ball 42. The reciprocation of piston 22 is repeated until the outer diameter of the tool bar 10 is the desired size. It will be noted that after completion of each inward stroke of piston 22, ball 42 seats as shown in FIG. 1 and chamber 14 is thereby sealed to maintain the pressure therein. Since it is actuation of plug 23 which expands the tool, and since plug 23 may be located remote from the operating surface of the tool, the tool can be conveniently expanded after insertion (or registration) with the work (even if a blind bore is to be lapped) without any possibility of interference with the work.

Figure 5:
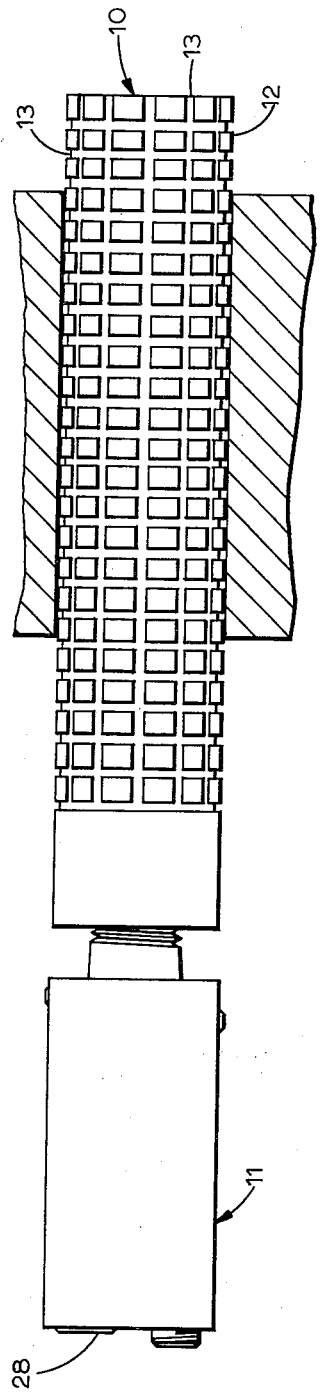
FIG. 5 is a view of the tool inside a bore after the tool has been expanded for operating engagement with the work.

After the tool is expanded to desired size, with the external surface of the tool in operating engagement with the bore surface, as shown in FIG. 5, the bore is lapped as with a conventional lapping tool. It will be noted that since the lapping bar can be brought into full registration with the surface of the workpiece to be lapped before the tool bar is expanded, as shown in FIG. 4, the lapping bar need not be worked into the bore of the workpiece, and flaring, or bell-mouthing, of the end of the workpiece bore is avoided. After the lapping operation is completed, the adjustment of needle valve 33 to open passage 32 will permit return of some fluid to reservoir 19, releasing pressure in chamber 14 and permitting the tool bar 10 to contract.

The expansibility of the tool bar permits the tool bar to be adjusted to a desired operating size even after considerable wear on the operating surface. A single pressure applicator 11 can be used with many different sized lapping bars and, after a lapping bar is worn beyond use, it is only the lapping bar which need be replaced.

What is claimed is:
1. A self contained tool comprising:
(a) a tool bar having an internal fluid chamber extending substantially the length of the tool bar, said chamber having an opening at one end of the tool bar, said tool bar having a continuous external operating surface expandable in response to a change in pressure in the chamber to change the effective size of the tool bar, and
(b) a pressure applicator connected to the tool bar at said opening and having a chamber to receive hydraulic fluid, said applicator having a piston to apply pressure through fluid in the applicator to fluid in the fluid chamber of the tool bar.
2. A self contained lapping tool comprising:
(a) a lapping bar having an internal fluid chamber extending substantially the length of the bar, said chamber having an opening at one end of the bar, said bar having a continuous external lapping surface expandable in response to a change in pressure in the chamber to change the effective size of the lapping bar, and
(b) a pressure applicator connected to the lapping bar at said opening and having a chamber to receive hydraulic fluid, said applicator having a piston to apply pressure through fluid in the applicator to fluid in the fluid chamber of the lapping bar, said applicator having a threaded member to actuate the piston and having a check valve to hold the pressure established in the fluid chamber.

References Cited by the Examiner

UNITED STATES PATENTS

| 1,444,314 | 2/23 | Herder | 51—192 |
| 2,153,521 | 4/39 | Indge et al. | 51—184.11 |
| 2,490,472 | 12/49 | Raske | 51—192 |
| 2,601,048 | 6/52 | Monger | 51—192 |
| 2,870,582 | 1/59 | Raske | 51—192 |

FOREIGN PATENTS

| 219,348 | 10/58 | Australia. |
| 879,657 | 6/53 | Germany. |
| 230,760 | 4/44 | Switzerland. |
| 235,341 | 3/45 | Switzerland. |

LESTER M. SWINGLE, *Primary Examiner.*